J. B. HARNSBERGER & C. H. TROUT.
HEAT GUARD FOR AUTOMOBILES.
APPLICATION FILED DEC. 3, 1913.

1,149,047.

Patented Aug. 3, 1915.

Witnesses
U. A. Williams
C. P. Wright, Jr.

Inventors.
J. B. Harnsberger
C. H. Trout,
By A. S. Pattison Attorney

UNITED STATES PATENT OFFICE.

JOHN B. HARNSBERGER AND CHARLES H. TROUT, OF FRONT ROYAL, VIRGINIA.

HEAT-GUARD FOR AUTOMOBILES.

1,149,047.

Specification of Letters Patent.

Patented Aug. 3, 1915.

Application filed December 3, 1913. Serial No. 804,412.

*To all whom it may concern:*

Be it known that we, JOHN B. HARNSBERGER and CHARLES H. TROUT, citizens of the United States, residing at Front Royal, in the county of Warren and State of Virginia, have invented certain new and useful Improvements in Heat-Guards for Automobiles, of which the following is a specification, reference being had therein to the accompanying drawing.

Our invention relates to improvements in heat guards for automobiles.

The object of our invention is to provide a guard for automobiles to prevent the hot air from passing upwardly through the openings in the bottom of the car through which the controlling levers pass, and pertains more particularly to an attachment to be applied to the Ford automobile.

Another object of our invention is to provide a simple, cheap and effective device of this character which can be readily applied to any automobile and having certain details of structure hereinafter more fully set forth.

Figure 1:
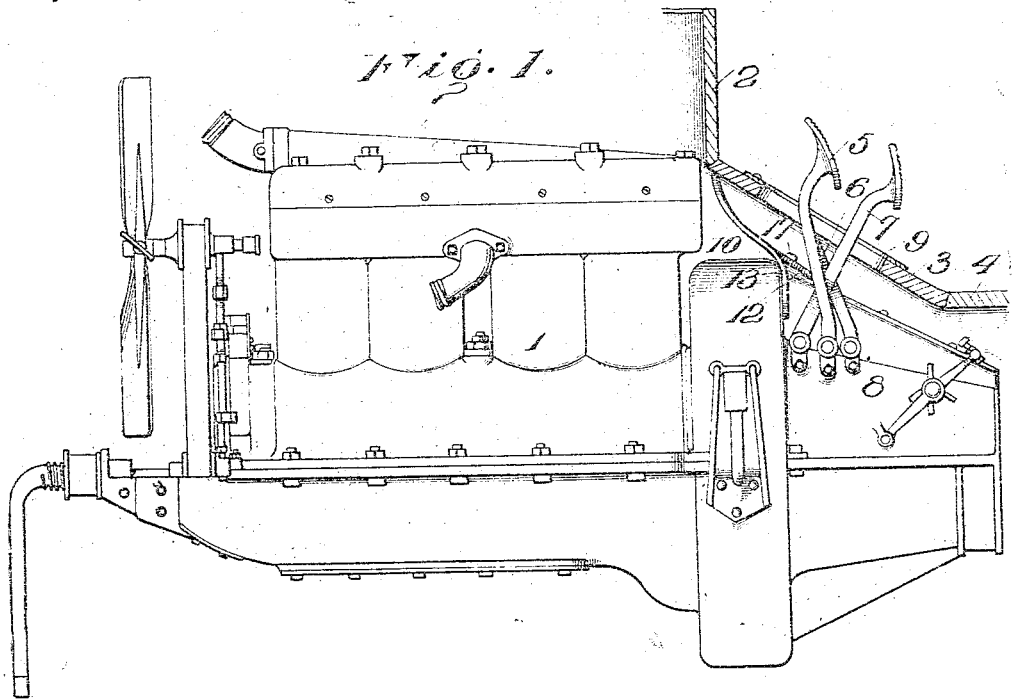
Figure 2:
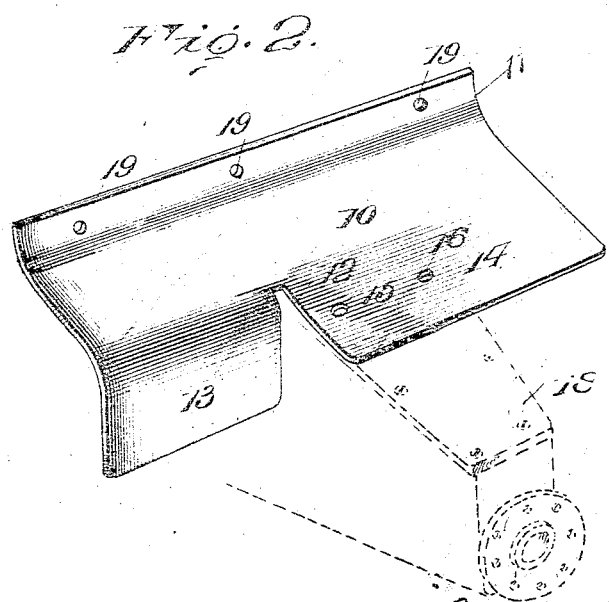

In the accompanying drawings Figure 1 is a vertical sectional view of an automobile showing our heat guard attached. Fig. 2 is a perspective view of the heat guard showing in dotted lines the transmission gear-case to which our improved guard is attached.

Referring now to the drawings, 1 represents the engine of an automobile, which is located within the hood in the front of the car; 2 represents the dash-board and 3 the slanting portion of the floor 4 of the car. In a Ford automobile and other automobiles, the controlling levers 5, 6 and 7 are pivoted to the transmission case 8, below the floor of the car and extend upwardly through slots 9 in the bottom of the car. All this being of a construction shown in the ordinary automobile, it needs no further description, as our invention resides in placing the guard below the floor of the automobile, so as to prevent the heat after passing through the hood of the engine, from passing upwardly through the slots 9 in the floor of the car, but will be diverted downwardly and pass under the bottom of the car.

The improved guard consists of a plate 10, preferably made of metal, but could be made of a composition of asbestos or other noncombustible material and which is of an elongated form, as clearly shown in Fig. 2. The upper edge of the guard is slightly curved, as indicated at 11, so that it will engage the bottom of the car 3 and form a comparatively tight joint therewith. The lower end of the plate 10, forming the guard, is provided with a notch 12 and the metal 13 on one side of said slot is turned downwardly. The portion 14 on the opposite side of the slot is in the same plane as the remainder of the guard and is provided with two openings 15 and 16 through which pass bolts 17, by means of which the guard is secured to the upper face of the transmission case 18. This transmission case has a slanting upper face, as shown in Fig. 1 of the drawing, and the downwardly turned portion 13 of the guard fits closely the side walls of the transmission case and extends down approximately in a line with the pivotal connection of the controlling levers 5, 6 and 7. As shown in Fig. 1 of the drawings, this downwardly turned portion 13, provides a space or room for the swinging of the levers and yet prevents the heated air, as it passes through the hood past the engine, from passing upwardly through the slots 9 in the slanting portion 3 in the bottom of the car.

While we have shown and described this invention more particularly adapted for the Ford automobile, it will be understood that it could be readily applied to any other automobile in which the controlling levers extend through the floor of the car.

In Fig. 2 of the drawings, we have shown the upper edge of the guard with openings 19, whereby the device can be secured directly to the floor of the car, as it might be found necessary in some cases where the transmission case is not directly beside the pivotal connection of the controlling levers.

As is readily understood, the fan at the forward end of the hood of the car draws the air through the radiator and forces it back past the engine and it strikes the inclined portion 3 on the bottom of the car and a greater portion thereof passes downwardly under the car. It has, however, been found a vast amount of the heat passes out through the slots and by the placing of the guard or plate 10 in the position shown in Fig. 1, the heat strikes the plate and is diverted downwardly and passes under the car without any of it passing upwardly through the slots 9 of the controlling levers.

Having thus described our invention, what we claim and desire to secure by Letters Patent is:

1. The combination with an automobile, having slots in the floor thereof, controlling levers passing through the slots and pivoted below the floor, a plate secured to the transmission at one side of the levers and having downwardly extending curved portion opposite the levers whereby the hot air is diverted downwardly past the floor of the car.

2. The combination with an automobile, having slots in the floor thereof, controlling levers passing through said slots and pivoted below the floor, of a plate having a curved upper end adapted to engage the floor of the car, means at one side of the plate for securing it to the transmission case, and a downwardly turned portion of the opposite side of the plate adapted to allow the levers to swing on their pivots and to divert the hot air from the engine downwardly past the slots in the floor of the car.

3. The combination with an automobile having slots in the floor thereof, controlling levers passing through the slots and pivoted below the floor, a plate secured below the floor at one side of the lever and having a downwardly extending curved portion opposite the levers whereby the hot air is diverted downwardly past the floor of the car.

4. The combination with an automobile having slots in the floor thereof, controlling levers passing through said slots and pivoted below the floor of the car, a plate having its upper end adapted to engage the floor of the car, means at one side of the floor for securing it to the transmission case and a downwardly turned portion at the opposite side of the plate adapted to allow the levers to swing on the pivots and to divert the hot air from the engine downwardly past the slots in the floor.

In testimony whereof we hereunto affix our signatures in the presence of two witnesses.

JOHN B. HARNSBERGER.
CHARLES H. TROUT.

Witnesses:
  W. W. LEGG,
  W. W. JOHNSON.